United States Patent Office 3,331,737
Patented July 18, 1967

3,331,737
FUMIGANTS
Alan John Maurice Wenham, Sunbury-on-Thames, Middlesex, and Arthur Douglas Harford, New Malden, Surrey, England, assignors to The British Petroleum Company Limited, London, England, a company of England
No Drawing. Filed Feb. 24, 1965, Ser. No. 435,078
Claims priority, application Great Britain, Mar. 11, 1964, 10,236/64
2 Claims. (Cl. 167—39)

This invention relates to fumigants and the use thereof. It has been found that halogenated compounds having the formula

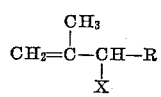

wherein R is a lower alkyl radical having 1 to 6 carbon atoms and X is chlorine, bromine or iodine, have good activity as fumigants.

These compounds may be used to protect stored products from insect attack. In particular, the compound 3-chloro-2-methylpentene-1 and its bromo- and iodo-analogues have been found to have excellent activity for the control of grain parasites, and are of use in storage bin fumigation.

The active compounds of the above formula may be readily prepared by known methods for example by the direct halogenation of olefins of the formula

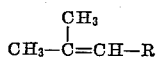

in the presence of an acid acceptor in the gas or liquid phase. The active compounds may be used in the form of the crude mixtures obtained from the halogenation of the above olefins. Such mixtures may contain 50–90% by weight of the active compounds.

The halo-compounds may be used either alone or in admixture with conventional carriers, particularly carbon tetrachloride. The compounds may also be used, if desired, in admixture with other fumigant materials e.g. methyl bromide, ethylene dibromide, 1,2 - dibromo-3-chloro-propane or mixtures of dichloropropane and dichloropropene.

The invention is illustrated by the following example.
To a mixture of 100 gms. 2-methylpentene-2 and 19 gms. calcium hydroxide, chlorine was added at room temperature at a rate of 35 mls. per minute for 261 minutes. Slight cooling of the mixture was necessary in order to maintain the reaction mixture at about room temperature during addition. It was observed that there was a weight increase of about 21.9 gms. Unreacted olefin was removed by distillation below 114° C. and the residue further distilled at 114–118° C. to recover 75.2 gms. of product which by G.L.C. analysis was shown to contain about 80% 3-chloro-2-methylpenten-1.

The crude product (A) obtained above was tested for fumigant activity against the red rust flour beetle *Tribolium castaneum*. The test procedure adopted was to expose 30 beetles to the vapour of a measured volume of the test sample in a 5 litre fumigation chamber for five hours at 27° C. After this time the beetles are transferred to a recovery chamber where they remain for 24 hours, and at the end of this time the percentage mortality is recorded.

In the table below, the results achieved with different volumes of the test compound (A) and three known fumigants is summarised.

TABLE

| Active compound | Boiling range, ° C. | Vol. of sample, ml. | Percent Kill |
|---|---|---|---|
| Ethylene dichloride | 82–84 | 0.1 | 3.3 |
|  |  | 0.3 | 51.7 |
|  |  | 0.5 | 100.0 |
| Ethylene dibromide | 129–132 | 0.02 | 3.0 |
|  |  | 0.04 | 10.0 |
|  |  | 0.06 | 31.3 |
| Ethylene trichloride | 87 | 0.1 | 100.0 |
|  |  | 0.2 | 7.1 |
|  |  | 0.4 | 56.7 |
| Product (A) | 114–118 | 0.02 | 6.9 |
|  |  | 0.04 | 45.2 |
|  |  | 0.06 | 100.0 |

It is seen that product (A) has a significantly better activity than the most potent of the three known fumigants i.e. ethylene dibromide.

The following table sets out the activities of various substances against *Tribolium castaneum* expressed as the $LD_{50}$ and $LD_{95}$ values, i.e. the lethal doses in mg. per litre which will effect a 50% or 95% kill respectively, with a 2-hour exposure time.

|  | $LD_{50}$ (mg./litre) | $LD_{95}$ (mg./P) |
|---|---|---|
| Ethylene dichloride | 155 | 245 |
| Ethylene dibromide | 50.8 | 135.4 |
| Product A | 18.4 | 51.5 |
| Product B | 13.1 | 25.8 |
| Product C | 82.8 | 115.1 |
| X | 5.8 | 7.3 |

Ethylene dichloride and dibromide are not within the scope of the present invention, but are merely included for comparison.

Product A is the product obtained as above described containing 80% 3-chloro-2-methylpentene-1.

Product B is similar to product A except that it contains 90% 3-chloro-2-methylpentene-1.

Product C is the product obtained from vapour phase chlorination of 2-methylbutene-2 and contains about 56% 3-chloro-2-methylbutene-1.

X is 3-bromo-2-methylpentene-1.

In addition, the activity of 3-iodo-2-methylpentene-1 was assessed, a concentration of 10 mg. per litre giving total kill.

We claim:
1. A method of fumigating stored products which comprises introducing thereto a fumigant comprising a halogenated compound of the formula:

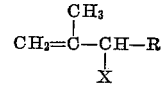

wherein X represents chlorine, bromine or iodine and R represents an alkyl radical having 1 to 6 carbon atoms.

2. A method according to claim 1 wherein the fumigant comprises 3-chloro-2-methylpentene-1, 3-bromo-2-methylpentene-1 or 3-iodo-2-methylpentene-1.

References Cited
UNITED STATES PATENTS 2,411,566  11/1946  Evans _____ 167—22
2,490,202  12/1949  Buntin _____ 167—22

LEWIS GOTTS, *Primary Examiner.*

S. K. ROSE, *Assistant Examiner.*